US008728423B2

(12) United States Patent
Iijima et al.

(10) Patent No.: US 8,728,423 B2
(45) Date of Patent: May 20, 2014

(54) METHOD AND APPARATUS FOR FLUE GAS TREATMENT

(75) Inventors: Masaki Iijima, Hiroshima (JP); Hasham Mukadam, Los Angeles, CA (US); Ronald M. Weiner, Houston, TX (US)

(73) Assignees: Mitsubishi Heavy Industries, Ltd., Tokyo (JP); Occidental Energy Ventures Corp., Houston, TX (US)

( * ) Notice: Subject to any disclaimer, the term of this patent is extended or adjusted under 35 U.S.C. 154(b) by 809 days.

(21) Appl. No.: 12/098,639

(22) Filed: Apr. 7, 2008

(65) Prior Publication Data

US 2009/0252659 A1 Oct. 8, 2009

(51) Int. Cl.
*B01D 53/62* (2006.01)
*C01B 31/20* (2006.01)

(52) U.S. Cl.
USPC ........ 423/219; 423/220; 423/437.1; 422/168; 422/182; 422/187

(58) Field of Classification Search
USPC ............... 423/219, 220, 437.1; 422/168, 169, 422/173, 182, 187; 431/5; 110/210; 60/772, 60/39.5
See application file for complete search history.

(56) References Cited

U.S. PATENT DOCUMENTS 4,364,915 A * 12/1982 Proctor ...................... 423/437.1
4,899,544 A * 2/1990 Boyd .............................. 60/618
5,344,627 A * 9/1994 Fujii et al. ..................... 423/220
5,461,853 A 10/1995 Vetterick
2002/0024038 A1 2/2002 Iijima et al.
2003/0140786 A1 7/2003 Iijima

FOREIGN PATENT DOCUMENTS

| JP | 2000-337108 A | 12/2000 |
|---|---|---|
| NO | 20030476 A | 8/2003 |
| RU | 2136930 C1 | 9/1999 |
| WO | 97/07329 A1 | 2/1997 |
| WO | 2004/027220 A1 | 4/2004 |

OTHER PUBLICATIONS

Office Action issued in Russian Patent Application No. 2008144181/06(057608), mail date Jan. 20, 2010.
Decision to Grant Patent issued in Russian Patent Application No. 2008144181/06(057608), mail date of Jun. 1, 2010.
Extended European Search Report dated Oct. 17, 2013, issued in corresponding European Patent Application No. 08165719.9.

* cited by examiner

*Primary Examiner* — Jill Warden
*Assistant Examiner* — Joye L Woodard
(74) *Attorney, Agent, or Firm* — Westerman, Hattori, Daniels & Adrian, LLP

(57) ABSTRACT

A method for flue gas treatment includes branching part of a flue gas stream emitted from a gas turbine from an upstream side or a downstream side of an exhaust heat recovery boiler and subjecting the branched part to combustion with a fuel in an auxiliary boiler so as to increase carbon dioxide concentration in the branched part prior to recombining the flue gas stream from the auxiliary boiler with the remaining part of the flue gas stream from the gas turbine to form a combined flue gas stream having a carbon dioxide concentration for efficient recovery in a carbon dioxide recovery apparatus.

6 Claims, 12 Drawing Sheets

METHOD AND APPARATUS FOR FLUE GAS TREATMENT

BACKGROUND OF THE INVENTION

1. Field of the Invention

The present invention relates to a method and an apparatus for flue gas treatment that improve efficiency of treatment of carbon dioxide contained in a flue gas emitted from, for example, a gas turbine.

2. Description of the Related Art

Various techniques have been proposed to separate carbon dioxide from a flue gas generated in power plants thereby to tackle the global warming. Proposed techniques include, for example, Pressure Swing Adsorption (PSA), membrane separation, and chemical absorption. Currently, carbon dioxide separators are rarely used in gas turbine combined plants which are high-efficiency power plants. When the carbon dioxide separators are employed, however, efficiency of net power generation deteriorates significantly because carbon dioxide concentration in a flue gas emitted from such plants is relatively low and a large amount of power is required for separation (see Japanese Patent Application Laid-Open No. 2000-337108, for example).

Further, the carbon dioxide concentration in a flue gas emitted from a gas turbine is as low as 3.93%. In order to recover carbon dioxide from such facility, a large volume of flue gas must be treated, and hence a large carbon dioxide recovery apparatus must be employed.

When the flue gas emitted from the gas turbine is recycled and reused in the same gas turbine for several times, the carbon dioxide concentration can be increased. However, modification of piping systems of existing facilities is difficult. Specifically, such modification of specification is difficult to realize in the gas turbine. Thus, such techniques are not actually adopted.

As an alternative, plural gas turbines can be installed in series so that the flue gas of an upstream gas turbine is sequentially used in a downstream gas turbine. However, the specification of the gas turbine is determined scrupulously in a design phase, and there is little possibility of actual application of a simple serial installation and sequential use of plural gas turbines for the increase in carbon dioxide concentration.

Figure 12:
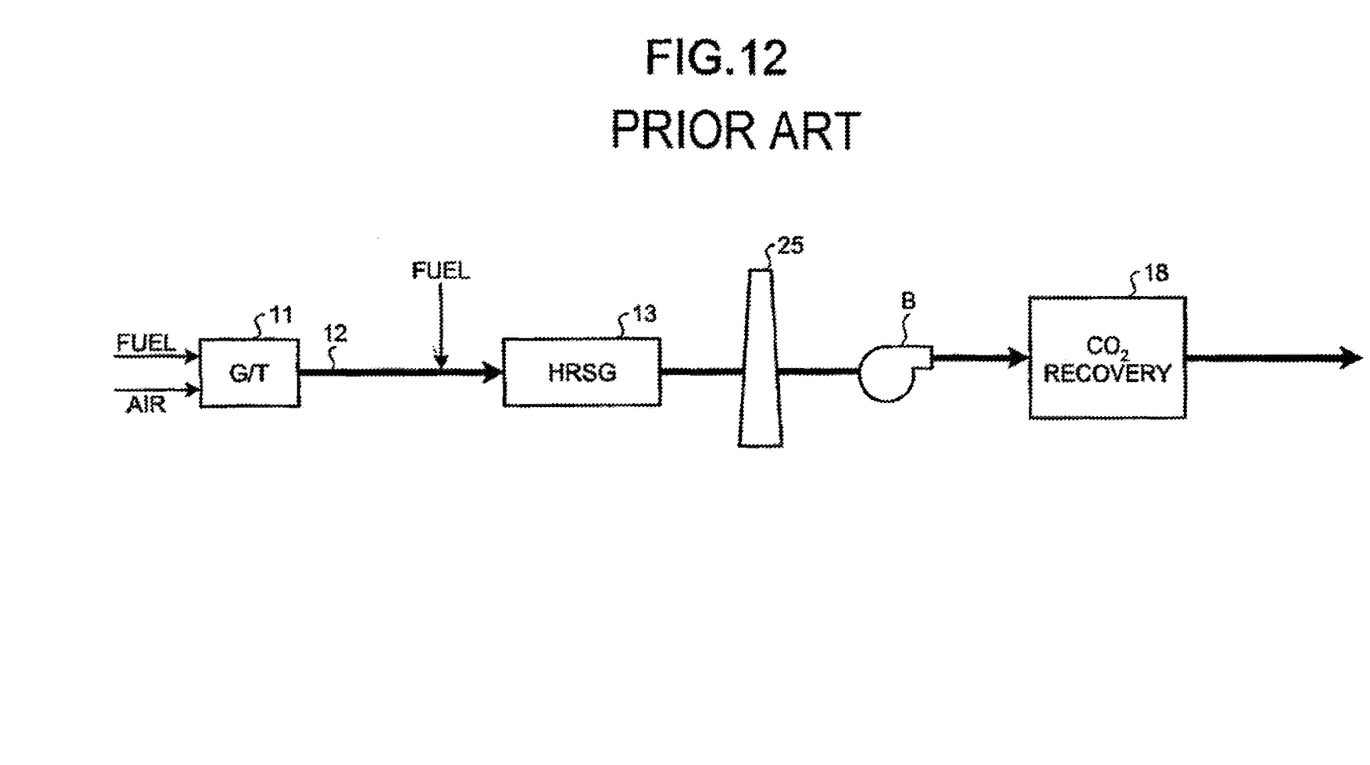
FIG. 12 is a schematic diagram of a conventional flue gas treatment apparatus.

As another alternative, it is possible to add a fuel to a flue gas emitted from an existing gas turbine and to re-burn in an exhaust heat recovery boiler. As shown in FIG. 12, in this case, while the carbon dioxide concentration in a flue gas 12 emitted from a gas turbine (G/T) 11 is 3.92 volume percent [vol %], the carbon dioxide concentration in a flue gas 14 from an exhaust heat recovery boiler (such as a heat recovery steam generator: HRSG) 13 can be as high as 4.6 vol %. However, it is difficult to add a large amount of fuel and re-burn. In addition, the increase is merely approximately 15%, which is insignificant. Thus, conventionally proposed techniques cannot achieve significant improvements in recovery efficiency of the carbon dioxide recovery apparatus.

In view of the foregoing, it is desirable to increase the carbon dioxide concentration in a flue gas emitted from a gas turbine in an existing gas turbine facility by a simple modification so as to improve the efficiency of carbon dioxide recovery.

SUMMARY OF THE INVENTION

In view of the above, an object of the present invention is to provide a method and an apparatus for flue gas treatment that improve efficiency of treatment of carbon dioxide contained in a flue gas emitted from, for example, a gas turbine.

As a result of strenuous efforts to solve the problems as described above, the inventors of the present invention have found that, in the recovery of carbon dioxide, it is necessary to generate a high-pressure, high-temperature steam for the recovery and compression of carbon dioxide, and that a boiler which usually uses air for steam generation can use a flue gas from a gas turbine instead of the air for combustion so that the carbon dioxide concentration in the flue gas is increased.

A method according to the first aspect of the present invention for flue gas treatment includes causing a combustion in a boiler using at least a part of a flue gas emitted from a gas turbine and introduced from at least one of an upstream side and a downstream side of an exhaust heat recovery boiler that recovers a high-temperature heat of the flue gas so as to increase a concentration of carbon dioxide in the flue gas, and recovering carbon dioxide in a carbon dioxide recovery apparatus.

According to the second aspect of the present invention, in the method of the first aspect, the boiler generates a high-pressure steam required for recovery and compression of carbon dioxide.

An apparatus according to the third aspect of the present invention for flue gas treatment includes a gas turbine, a boiler that causes a combustion of a flue gas emitted from the gas turbine, and a carbon dioxide recovery apparatus that recovers carbon dioxide after an increase of carbon dioxide concentration in a flue gas emitted from the boiler.

According to the fourth aspect of the present invention, the apparatus of the third aspect further includes an exhaust heat recovery boiler arranged at a downstream side of the gas turbine, wherein a flue gas emitted from the exhaust heat recovery boiler is burnt in the boiler so that the carbon dioxide concentration in the flue gas emitted from the boiler is increased, and the carbon dioxide recovery apparatus recovers carbon dioxide after the increase of the carbon dioxide concentration.

According to the fifth aspect of the present invention, the apparatus of the third aspect further includes an exhaust heat recovery boiler arranged at a downstream side of the gas turbine, wherein a part of a flue gas emitted from the exhaust heat recovery boiler is burnt in the boiler, a flue gas emitted from the boiler is combined with the flue gas emitted from the exhaust heat recovery boiler so that carbon dioxide concentration in a combined flue gas is increased, and the carbon dioxide recovery apparatus recovers carbon dioxide after the increase of the carbon dioxide concentration.

According to the sixth aspect of the present invention, the apparatus of the third aspect further includes an exhaust heat recovery boiler arranged at a downstream side of the gas turbine, wherein a part of a flue gas emitted from the gas turbine is burnt in the boiler, a flue gas emitted from the boiler is combined with a flue gas emitted from the exhaust heat recovery boiler so that carbon dioxide concentration of a combined flue gas is increased, and the carbon dioxide recovery apparatus recovers carbon dioxide after the increase of the carbon dioxide concentration.

According to the seventh aspect of the present invention, the apparatus of the third aspect further includes plurality of the gas turbines, and plural exhaust heat recovery boilers arranged respectively at downstream sides of the gas turbines except for one gas turbine, wherein the boiler causes a combustion of a total amount of a flue gas emitted from the one gas turbine, a flue gas emitted from the boiler is combined with flue gases emitted respectively from the exhaust heat recovery boilers so that carbon dioxide concentration of a combined flue gas is increased, and the carbon dioxide recovery apparatus recovers carbon dioxide after the increase of the carbon dioxide concentration.

According to the eighth aspect of the present invention, in the apparatus according to the third aspect, the boiler generates a high pressure steam required for recovery and compression of carbon dioxide.

According to the ninth aspect of the present invention, in the apparatus according to the fourth aspect, the boiler generates a high pressure steam required for recovery and compression of carbon dioxide.

According to the tenth aspect of the present invention, in the apparatus according to the fifth aspect, the boiler generates a high pressure steam required for recovery and compression of carbon dioxide.

According to the eleventh aspect of the present invention, in the apparatus according to the sixth aspect, the boiler generates a high pressure steam required for recovery and compression of carbon dioxide.

According to the twelfth aspect of the present invention, in the apparatus according to the seventh aspect, the boiler generates a high pressure steam required for recovery and compression of carbon dioxide.

According to the thirteenth aspect of the present invention, in the apparatus according to the eighth aspect, the boiler generates a high pressure steam required for recovery and compression of carbon dioxide.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described in detail below with reference to the accompanying drawings. It should be noted that the present invention is not limited by the following embodiments. Further, elements of the following embodiments may include those easily conceivable by those skilled in the art or those substantially the same therewith.

First Embodiment

A flue gas treatment apparatus according to a first embodiment of the present invention will be described with reference to the accompanying drawings.

Figure 1:
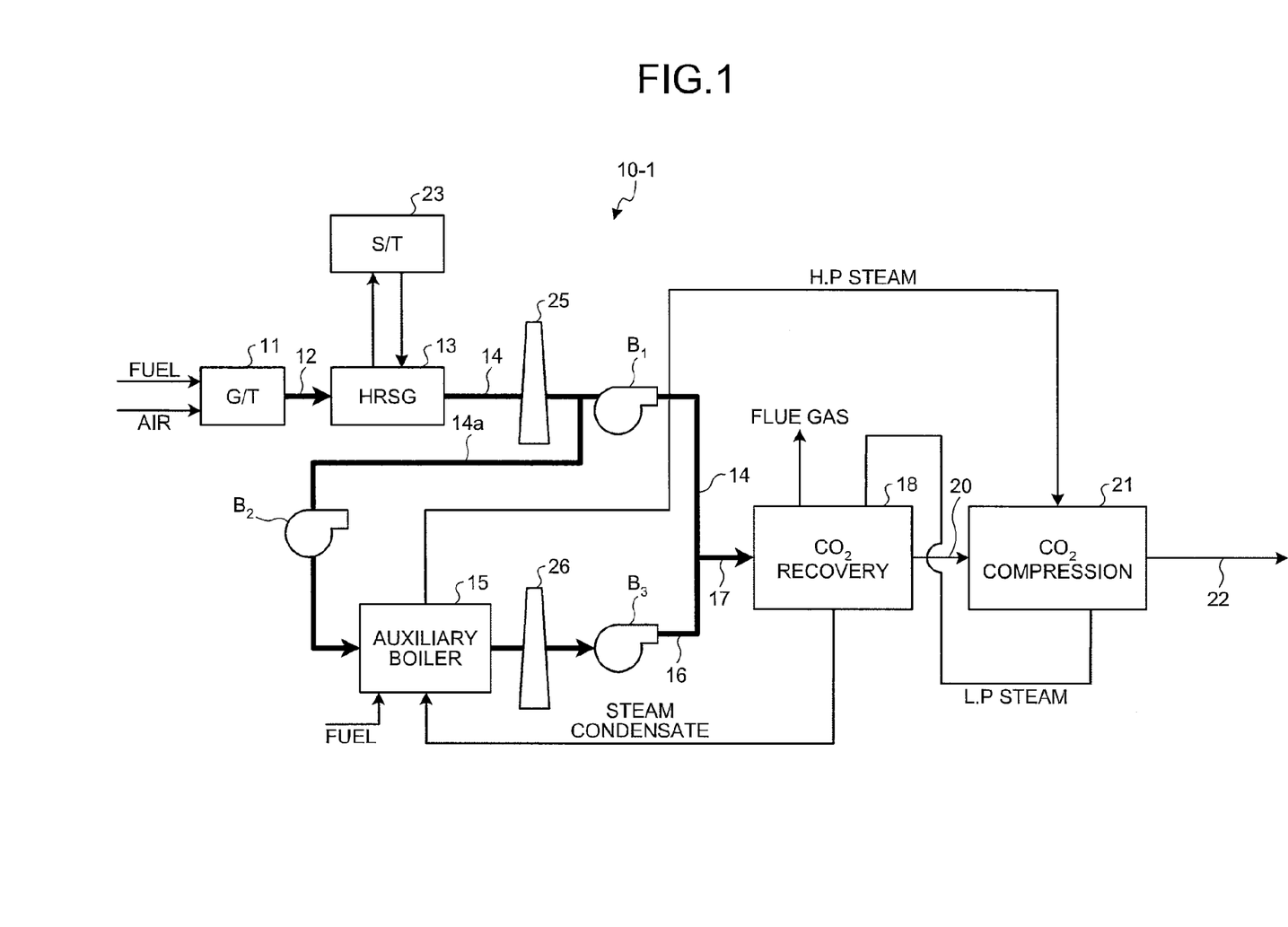
FIG. 1 is a schematic diagram of a flue gas treatment apparatus according to a first embodiment.

FIG. 1 is a schematic diagram of the flue gas treatment apparatus according to the first embodiment.

As shown in FIG. 1, a flue gas treatment apparatus 10-1 of the first embodiment includes a gas turbine (G/T) 11 that is a combustion apparatus causing combustion using, for example, natural gas fuel and air, an exhaust heat recovery boiler (such as HRSG) 13 that recovers high-temperature heat (of approximately 580° C.) of a flue gas 12 emitted from the gas turbine 11, an auxiliary boiler 15 that causes combustion of a branched part 14a (of 10% to 30%) of a flue gas 14 emitted from the exhaust heat recovery boiler 13, and a carbon dioxide recovery apparatus 18 that recovers carbon dioxide in a combined flue gas 17 which includes the flue gas 14 from the exhaust heat recovery boiler 13 and a flue gas 16 from the auxiliary boiler 15.

In FIG. 1, reference character 20 indicates carbon dioxide separated by the carbon dioxide recovery apparatus 18, 21 indicates a carbon dioxide compression apparatus, 22 indicates carbon dioxide compressed in the carbon dioxide compression apparatus 21, 23 indicates a steam turbine (S/T), 25 and 26 indicate chimneys, and $B_1$ to $B_3$ indicate blowers.

In the first embodiment, at a downstream side of the exhaust heat recovery boiler (HRSG) 13 which recovers high-temperature heat (of approximately 580° C.) of the flue gas 12 emitted from the gas turbine 11, the part 14a of the flue gas 14 is branched and supplied to the auxiliary boiler 15 and used in place of air for combustion, so that the carbon dioxide concentration in the flue gas 16 emitted from the auxiliary boiler 15 increases.

Here, the rate of the branched part of the flue gas 14 can be changed appropriately according to boiler plants, and preferably is 10 to 30%.

The carbon dioxide contained in the flue gas at an increased concentration is recovered by the carbon dioxide recovery apparatus 18, and recovered carbon dioxide 20 is compressed in the carbon dioxide compression apparatus 21. Compressed carbon dioxide 22 is transported to an outside system, for example, to a urea plant, methanol plant, dimethyl ether plant, plant (such as GTL plant) for synthesizing heating oil and light oil, and to the earth, or introduced into an underground oil mine in a compressed state for an improvement of a recovery rate of crude oil, whereby carbon dioxide emission into an atmosphere can be made substantially zero or zero.

As can be seen from the above, the flue gas treatment apparatus according to the first embodiment of the present invention includes the gas turbine 11 and the auxiliary boiler 15 that causes combustion of the flue gas 12 emitted from the gas turbine 11, and the exhaust heat recovery boiler 13 is arranged at the downstream side of the gas turbine 11 in such a manner that the flue gas 14 emitted from the exhaust heat recovery boiler 13 is combined with the flue gas 16 emitted from the auxiliary boiler 15, which causes combustion of the part 14a of the flue gas 14 emitted from the exhaust heat recovery boiler 13, whereby the carbon dioxide concentration in the flue gas 16 emitted from the auxiliary boiler 15 can be increased and the recovery efficiency of the carbon dioxide recovery apparatus 18 can be improved.

As the carbon dioxide recovery apparatus, a known apparatus which uses a carbon dioxide absorbent (such as amine solution) and includes a carbon dioxide absorption tower for absorbing carbon dioxide and a recovery tower for separating carbon dioxide from the carbon dioxide absorbent to reuse the carbon dioxide absorbent can be used.

Further, since the auxiliary boiler 15 can generate a high-pressure steam required for the recovery of carbon dioxide by the carbon dioxide recovery apparatus 18 and the compression of carbon dioxide by the carbon dioxide compression apparatus 21, steam generated in the exhaust heat recovery boiler 13 is not used in the recovery of carbon dioxide. After being used in the carbon dioxide compression apparatus 21, the high-pressure steam is employed for separating carbon dioxide in the carbon dioxide recovery apparatus 18. Thereafter, condensate is returned to the auxiliary boiler 15.

According to the first embodiment of the present invention, the concentration of carbon dioxide coming into the carbon dioxide recovery apparatus can be increased. Further, the fuel consumption of the auxiliary boiler can be reduced through the use of exhaust heat coming out from the exhaust heat recovery boiler.

Second Embodiment

A flue gas treatment apparatus according to a second embodiment of the present invention will be described with reference to the accompanying drawings.

Figure 2:
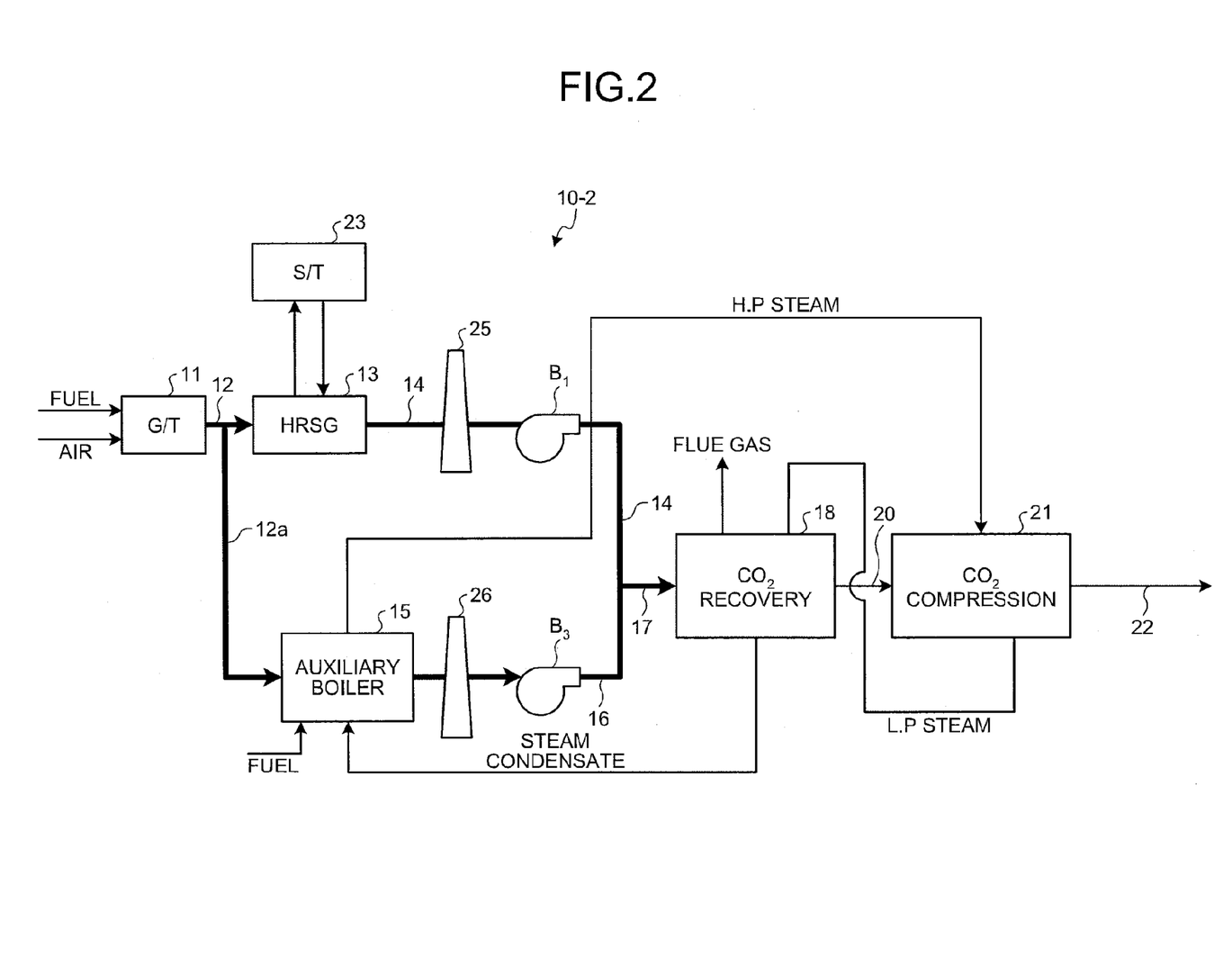
FIG. 2 is a schematic diagram of a flue gas treatment apparatus according to a second embodiment.

FIG. 2 is a schematic diagram of the flue gas treatment apparatus according to the second embodiment.

As shown in FIG. 2, a flue gas treatment apparatus 10-2 of the second embodiment includes a gas turbine (G/T) 11 that is a combustion apparatus causing combustion using, for example, natural gas fuel and air, an exhaust heat recovery boiler (such as HRSG) 13 that recovers high-temperature heat (of approximately 580° C.) of a flue gas 12 emitted from the gas turbine 11, an auxiliary boiler 15 that causes combustion of a branched part 12a of the flue gas 12 emitted from the gas turbine 11, and a carbon dioxide recovery apparatus 18 that recovers carbon dioxide in a combined flue gas 17 which includes a flue gas 16 emitted from the auxiliary boiler 15 and a flue gas 14 emitted from the exhaust heat recovery boiler 13.

In the first embodiment, the branch is formed at the downstream side of the exhaust heat recovery boiler 13. In the second embodiment, a branch is formed at the upstream side of the exhaust heat recovery boiler 13 so that a part of the high-temperature flue gas 12 (of approximately 580° C.) is introduced into the auxiliary boiler 15, whereby a fuel supplied to the auxiliary boiler 15 can be reduced significantly.

The rate of the branched part of the flue gas 12 can be changed appropriately according to boiler plants, and preferably is 8 to 30%.

As can be seen from the above, the flue gas treatment apparatus according to the second embodiment of the present invention includes the gas turbine 11 and the auxiliary boiler 15 that causes combustion of the flue gas 12 emitted from the gas turbine 11, and the exhaust heat recovery boiler 13 is arranged at the downstream side of the gas turbine 11 in such a manner that the flue gas 14 emitted from the exhaust heat recovery boiler 13 is combined with the flue gas 16 emitted from the auxiliary boiler 15, which causes combustion of the part 12a of the flue gas 12 emitted from the gas turbine 11, whereby the carbon dioxide concentration in the flue gas 16 emitted from the auxiliary boiler 15 can be increased and the recovery efficiency of the carbon dioxide recovery apparatus 18 can be improved.

Third Embodiment

A flue gas treatment apparatus according to a third embodiment of the present invention will be described with reference to the accompanying drawings.

Figure 3:
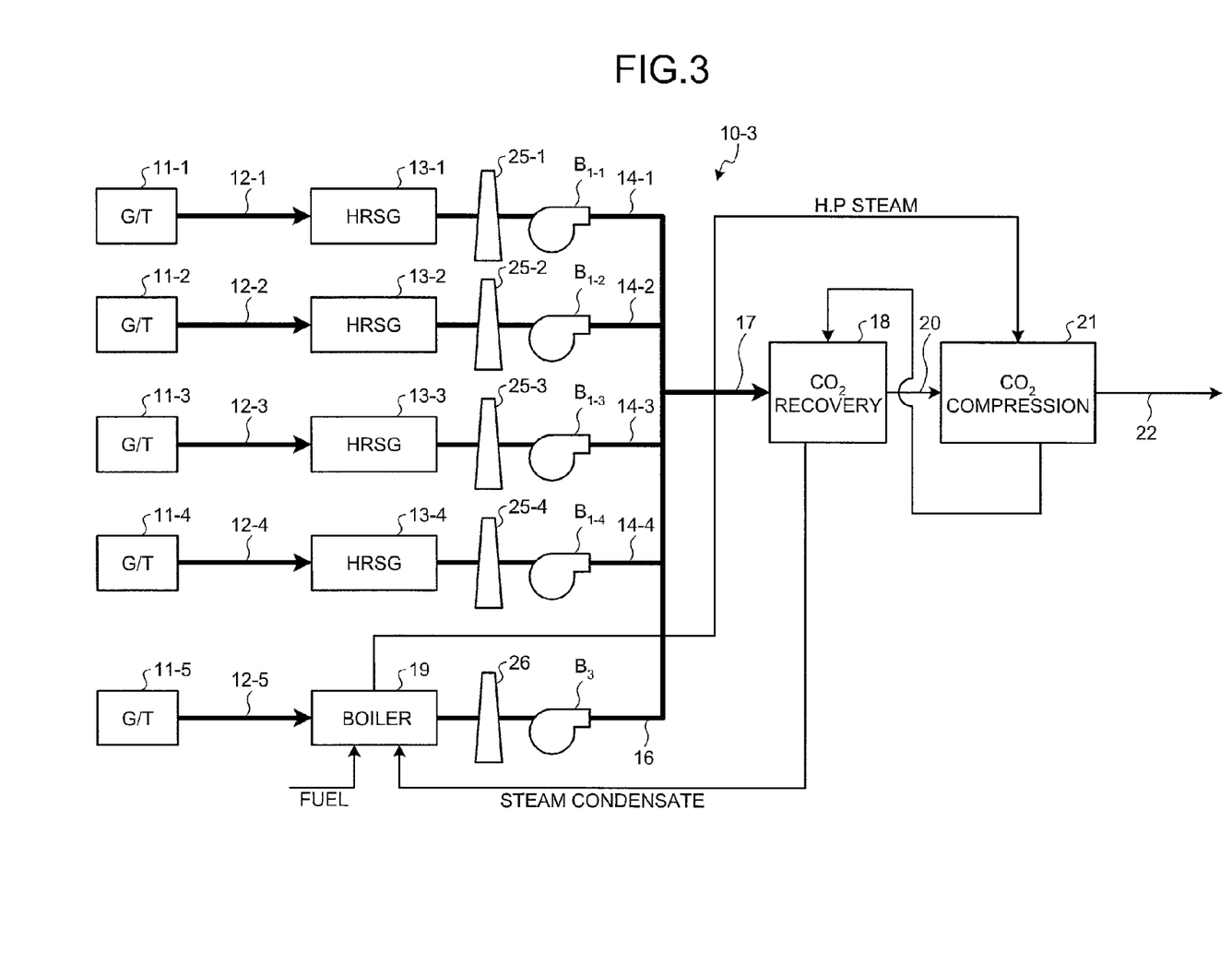
FIG. 3 is a schematic diagram of a flue gas treatment apparatus according to a third embodiment.

FIG. 3 is a schematic diagram of the flue gas treatment apparatus according to the third embodiment.

As shown in FIG. 3, a flue gas treatment apparatus 10-3 of the third embodiment includes gas turbines (G/T) 11 arranged in parallel as combustion apparatuses causing combustion using, for example, natural gas fuel and air, exhaust heat recovery boilers (such as HRSG) 13 arranged in parallel to recover high-temperature heat (of approximately 580° C.) of flue gases 12 emitted from the gas turbines 11, a carbon dioxide recovery apparatus 18 that recovers carbon dioxide in a flue gas which includes flue gases 14-1 to 14-4 from the plural exhaust heat recovery boilers 13-1 to 13-4, and a boiler 19 that causes combustion of a total amount of the flue gas 12 emitted from at least one gas turbine 11-5 among the plural gas turbines, and the carbon dioxide recovery apparatus 18 recovers carbon dioxide in a combined flue gas 17 which includes a flue gas 16 emitted from the boiler 19 and the flue gases 14-1 to 14-4.

Some large-scale plants have plural gas turbine facilities. For the treatment of flue gas emitted from boilers of such plant, flue gas from one gas turbine facility among plural gas turbine facilities is directly introduced into the boiler 19 so as to increase carbon dioxide concentration in the flue gas 16. Then, the flue gas with an increased carbon dioxide concentration is combined with the flue gases 14-1 to 14-4 emitted respectively from the exhaust heat recovery boilers 13-1 to 13-4 connected respectively to the gas turbines (gas turbine facilities) 11-1 to 11-4, so that the carbon dioxide concentration in the combined flue gas 17 is increased.

As can be seen from the above, the third embodiment of the present invention deals with a facility where plural gas turbine facilities are installed, by introducing a total amount of a flue gas 12-5 emitted from at least one gas turbine 11-5 among the plural gas turbines into the boiler 19 to cause combustion so as to increase the carbon dioxide concentration in the flue gas 16 emitted from the boiler 19, and further combining the flue gases 14-1 to 14-4 from the exhaust heat recovery boilers 13-1 to 13-4 of the rest of the gas turbine facilities with the flue gas 16 to supply the combined flue gas to the carbon dioxide recovery apparatus 18, whereby the efficiency of the recovery of carbon dioxide can be improved.

Fourth Embodiment

A flue gas treatment apparatus according to a fourth embodiment of the present invention will be described with reference to the accompanying drawings.

Figure 4:
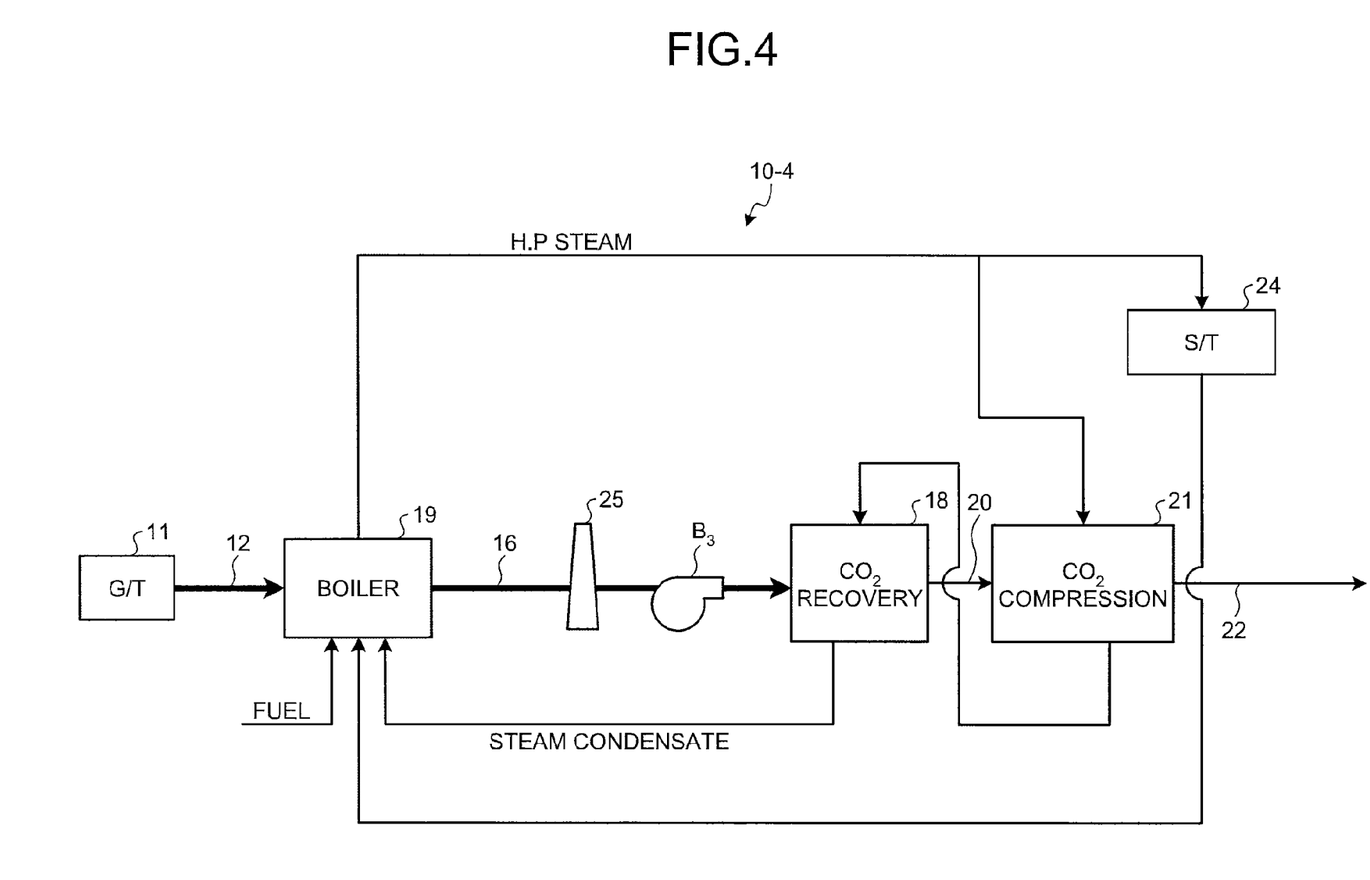
FIG. 4 is a schematic diagram of a flue gas treatment apparatus according to a fourth embodiment.

FIG. 4 is a schematic diagram of the flue gas treatment apparatus according to the fourth embodiment.

As shown in FIG. 4, a flue gas treatment apparatus 10-4 of the fourth embodiment includes a gas turbine (G/T) 11 that is a combustion apparatus causing combustion using, for example, natural gas fuel and air, a boiler 19 that causes combustion of a total amount of a flue gas 12 emitted from the gas turbine 11, and a carbon dioxide recovery apparatus 18 that recovers carbon dioxide in a flue gas 16 emitted from the boiler 19.

In the first and the second embodiments described above, a branch is formed at the downstream side or the upstream side of the exhaust heat recovery boiler. In the fourth embodiment, a total amount of the high-temperature flue gas 12 (of 580° C.) emitted from the gas turbine 11 is directly introduced into the boiler 19 without any branches, whereby the carbon dioxide concentration in the flue gas 16 emitted from the boiler 19 is increased. Further, an excess of generated steam can be supplied to a steam turbine (S/T) 24 for power generation.

As can be seen from the above, according to the fourth embodiment of the present invention, the total amount of the flue gas 12 from the gas turbine 11 is introduced into the boiler 19 and burnt so as to increase the carbon dioxide concentration in the flue gas 16 emitted from the boiler 19, whereby the recovery efficiency of the carbon dioxide recovery apparatus 18 can be improved.

Fifth Embodiment

A flue gas treatment apparatus according to a fifth embodiment of the present invention will be described with reference to the accompanying drawings.

Figure 5:
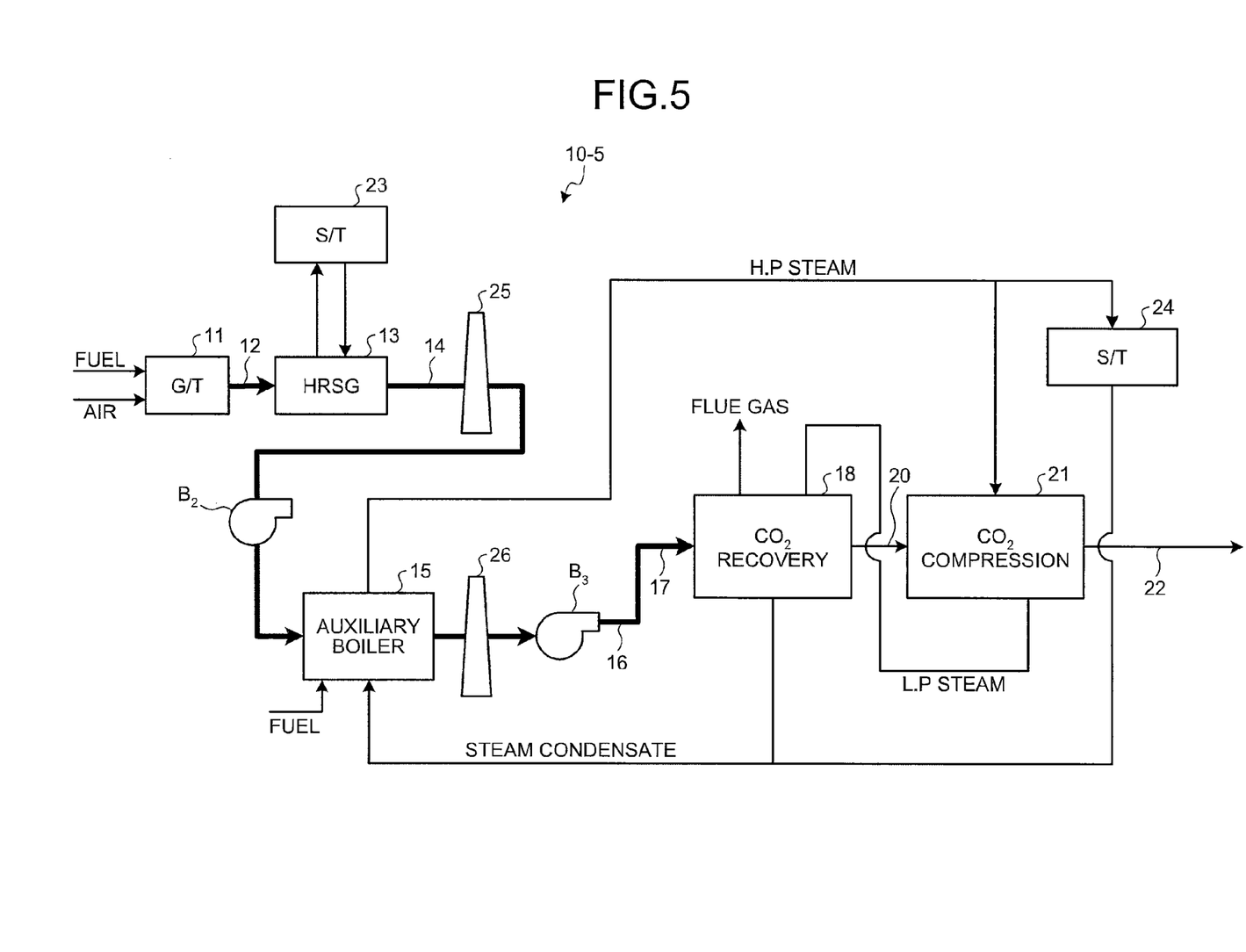
FIG. 5 is a schematic diagram of a flue gas treatment apparatus according to a fifth embodiment.

FIG. 5 is a schematic diagram of the flue gas treatment apparatus according to the fifth embodiment.

As shown in FIG. 5, a flue gas treatment apparatus 10-5 of the fifth embodiment includes a gas turbine (G/T) 11 that is a combustion apparatus causing combustion using, for example, natural gas fuel and air, an exhaust heat recovery boiler (such as HRSG) 13 that recovers high-temperature heat (of approximately 580° C.) of a flue gas 12 emitted from the gas turbine 11, an auxiliary boiler 15 that causes combustion of a total amount of a flue gas 14 emitted from the exhaust heat recovery boiler 13, and a carbon dioxide recovery apparatus 18 that recovers carbon dioxide in a combined flue gas 17 which includes a flue gas 16 from the auxiliary boiler 15.

In the first and the second embodiments described above, the branch is formed at the downstream side or the upstream side of the exhaust heat recovery boiler 13. In the fourth embodiment, a total amount of the flue gas 14 emitted from the exhaust heat recovery boiler 13 is directly introduced into the auxiliary boiler 15 without any branches, whereby the carbon dioxide concentration in the flue gas 16 emitted from the auxiliary boiler 15 is increased. Further, an excess of generated steam can be supplied to a steam turbine (S/T) 24 for power generation.

Test examples exemplifying an effect of the present invention will be described below, though the present invention is not limited thereby.

Test Example 1

Figure 6:
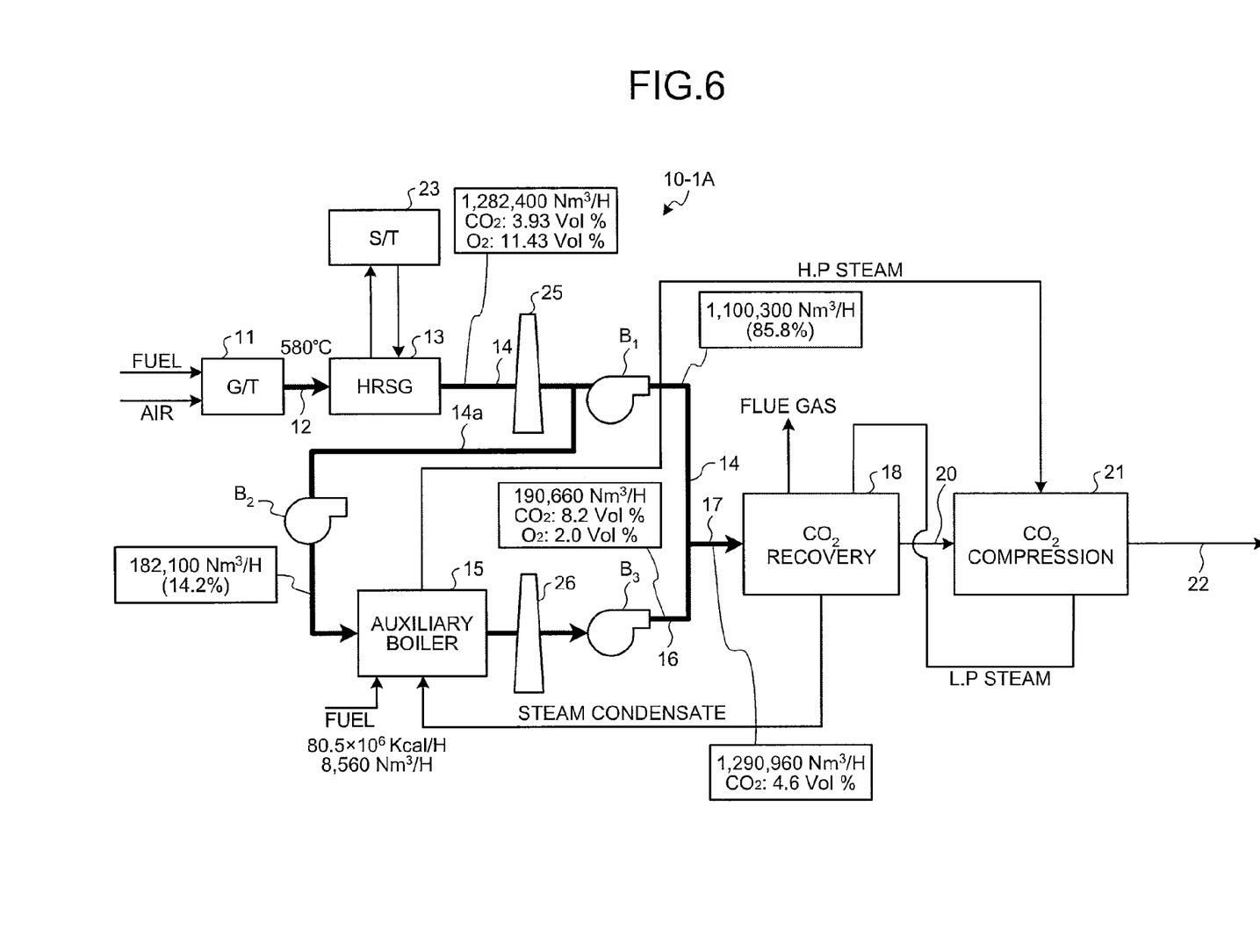
FIG. 6 is a schematic diagram of a flue gas treatment apparatus according to a test example 1.

FIG. 6 is a schematic diagram of an apparatus similar to the flue gas treatment apparatus according to the first embodiment shown in FIG. 1. In the apparatus of FIG. 6, the flue gas 12 of 580° C. emitted from the gas turbine 11 was introduced into the exhaust heat recovery boiler 13, and the part 14a (branched rate: 14.2%, flow rate: 182,100 $Nm^3/H$) of the flue gas (flow rate: 1,282,400 $Nm^3/H$, $CO_2$ concentration: 3.93 vol %, $O_2$ concentration: 11.43 vol %) 14 emitted from the exhaust heat recovery boiler 13 was introduced into the auxiliary boiler 15.

In the test example 1, an employed gas turbine was PG724 (FA type) of General Electric Company. The flue gas 14 emitted from the exhaust heat recovery boiler included 70.25 vol % of nitrogen, 11.43 vol % of oxygen, 3.93 vol % of carbon dioxide, and 13.55 vol % of water, and the temperature was 88.4° C.

The flow rate and the thermal capacity of fuel supplied to the auxiliary boiler 15 were 8,560 $Nm^3/H$ and 80.5×106 Kcal/H, respectively, and the $CO_2$ concentration in the flue gas 16 was 8.2 vol % (the flow rate and the $O_2$ concentration in the flue gas 16 were 190,660 $Nm^3/H$ and 2.0 vol %, respectively). The $CO_2$ concentration in the combined flue gas 17 which included the flue gas 14 (flow rate: 1,100,300 $Nm^3/H$, branched rate: 85.8%) and the flue gas 16 was 4.6 vol % (the flow rate of the combined flue gas 17 was 1,290,960 $Nm^3/H$).

Comparative Example 1

Figure 7:
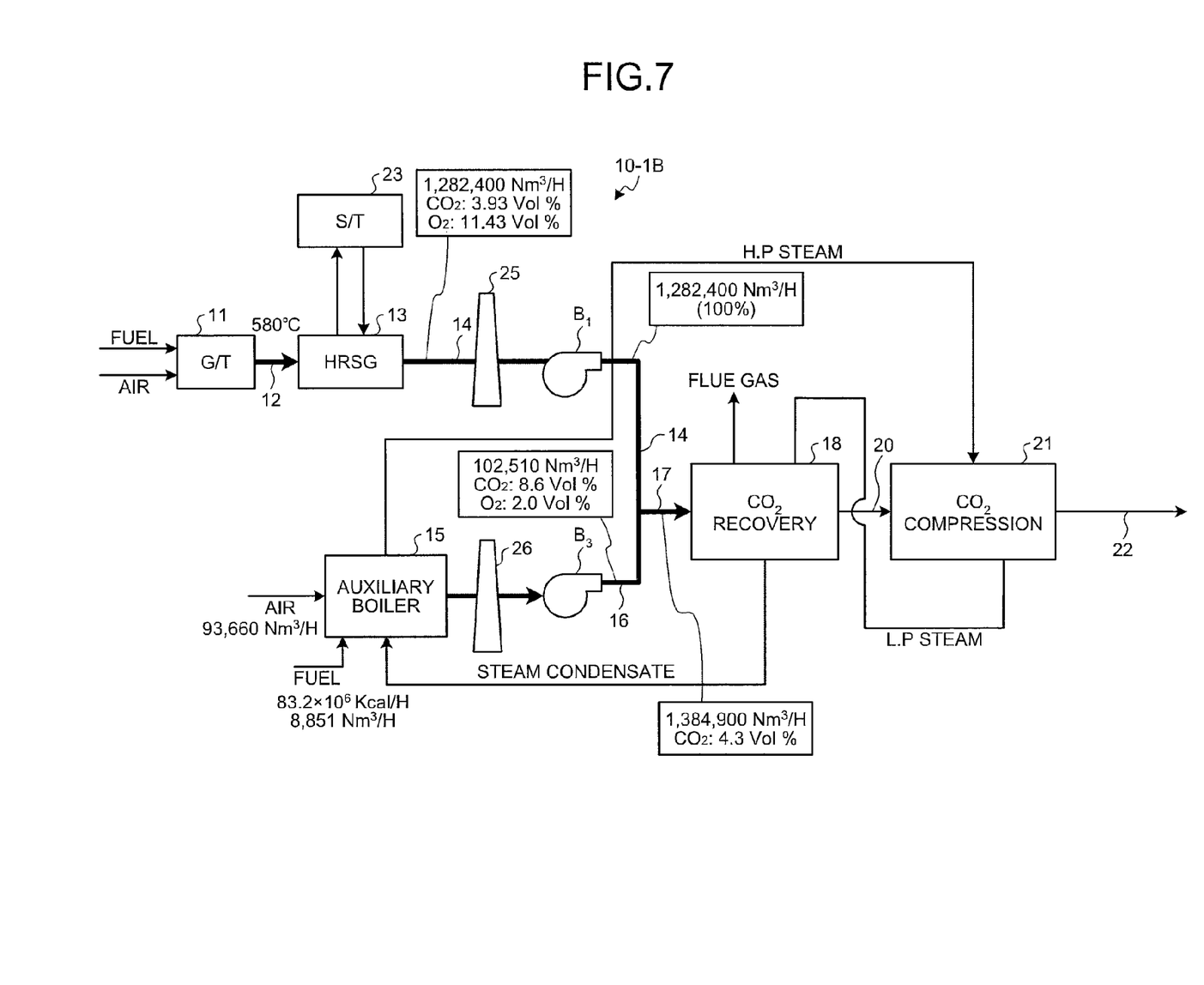
FIG. 7 is a schematic diagram of a flue gas treatment apparatus according to a comparative example 1.

FIG. 7 is a schematic diagram of an apparatus similar to the flue gas treatment apparatus of the test example 1 shown in FIG. 6. In the apparatus of FIG. 7, however, the flue gas 14 (flow rate: 1,282,400 $Nm^3/H$, $CO_2$ concentration: 3.93 vol %, and $O_2$ concentration; 11.43 vol %) from the exhaust heat recovery boiler 13 was not introduced into the auxiliary boiler 15, and instead, an air (flow rate: 93.660 $Nm^3/H$) was introduced into the auxiliary boiler 15.

In the comparative example 1, since the introduced air was of a low temperature, the flow rate of the fuel supplied to the auxiliary boiler 15 was 8,851 $Nm^3/H$ (and the thermal capacity was 83.2×106 Kcal/H), and the $CO_2$ concentration of the flue gas 16 was 8.6 vol % (flow rate: 102,510 $Nm^3/H$, and $O_2$ concentration: 2.0 vol %). The $CO_2$ concentration of the combined flue gas 17 which included the flue gas 14 and the flue gas 16 was 4.3 vol % (and the flow rate was 1,384,900 $Nm^3/H$).

Thus, it is found that test example 1 can realize higher increase in the carbon dioxide concentration than the comparative example 1.

Test Example 2

Figure 8:
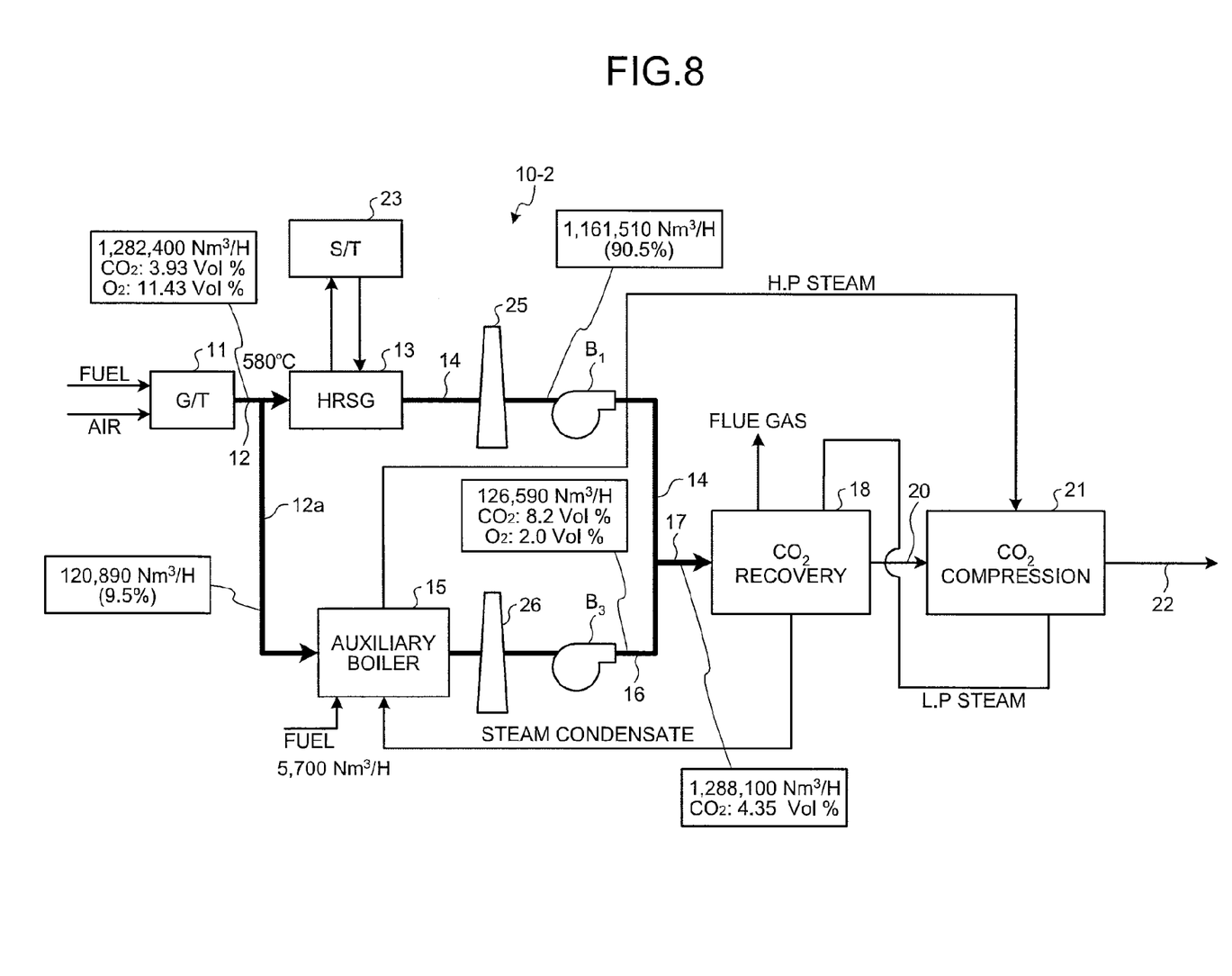
FIG. 8 is a schematic diagram of a flue gas treatment apparatus according to a test example 2.

FIG. 8 is a schematic diagram of an apparatus similar to the flue gas treatment apparatus according to the second embodiment shown in FIG. 2. In the apparatus of FIG. 8, a part (branched rate: 9.5%, flow rate: 120,890 $Nm^3/H$) of the flue gas 12 (flow rate: 1,282,400 $Nm^3/H$, $CO_2$ concentration: 3.93 vol %, and $O_2$ concentration; 11.43 vol %) emitted from the gas turbine 11 was introduced into the auxiliary boiler 15.

In this example, since the introduced flue gas 12 was of a high temperature (of 580° C.), the fuel supplied to the auxiliary boiler 15 could be reduced to 5,700 $Nm^3/H$, which was a significant reduction from the amount used in the test example 1.

The $CO_2$ concentration in the combined flue gas 17 which included the flue gas 14 (branched rate: 90.5%, flow rate: 1,161,510 $Nm^3/H$) and the flue gas 16 (flow rate: 126,590 $Nm^3/H$, $CO_2$ concentration: 8.2 vol %, and $O_2$ concentration; 2.0 vol %) was 4.35 vol % (and the flow rate was 1,288,100 $Nm^3/H$).

Test Example 3

Figure 9:
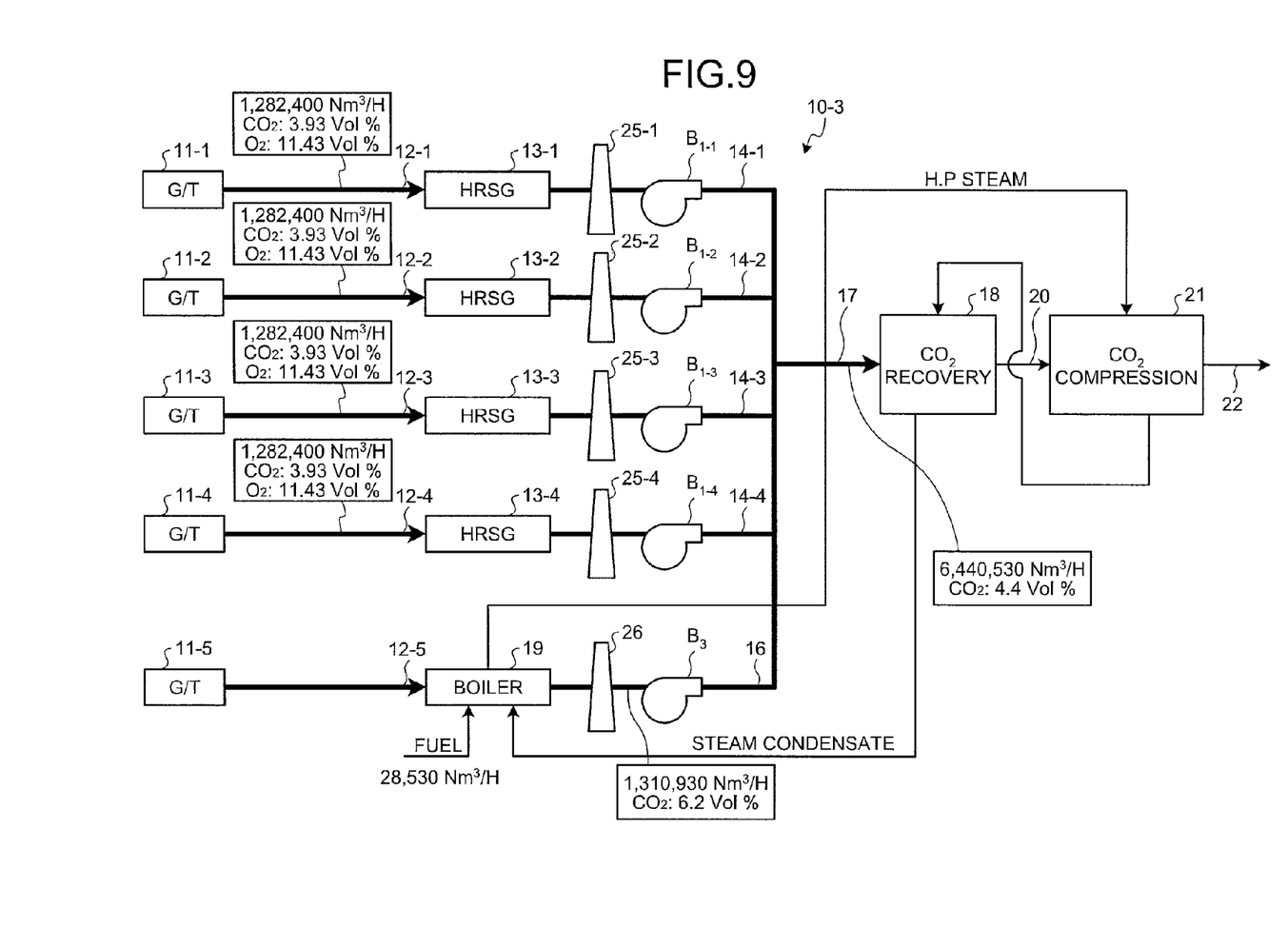
FIG. 9 is a schematic diagram of a flue gas treatment apparatus according to a test example 3.

FIG. 9 is a schematic diagram of an apparatus similar to the flue gas treatment apparatus according to the third embodiment shown in FIG. 3. In the apparatus of FIG. 9, among the plural (five in the test example 3) gas turbines respectively indicated as first to fifth gas turbines 11-1 to 11-5, the first to the fourth gas turbines 11-1 to 11-4 were connected respectively to the exhaust heat recovery boilers 13-1 to 13-4 for the exhaust heat recovery, so that flue gases 12-1 to 12-4 (for each, flow rate: 1,282,400 $Nm^3/H$, $CO_2$ concentration: 3.93 vol %, $O_2$ concentration: 11.43 vol %) therefrom were introduced into the exhaust heat recovery boilers 13-1 to 13-4, respectively, while the total amount of the flue gas 12-5 from the fifth gas turbine 11-5 was introduced into the boiler 19. The flow rate of the fuel supplied to the boiler 19 was 28,530 $Nm^3/H$.

In this example, since the total amount of the flue gas 12-5 from the fifth gas turbine 11-5 was introduced into the boiler 19, the $CO_2$ concentration in the combined flue gas 17 which included the flue gases 14-1 to 14-4 and the flue gas 16 (flow rate: 1,310,930 $Nm^3$/H, $CO_2$ concentration: 6.2 vol %) could be increased to 4.4 vol % (and the flow rate was 6,440,530 $Nm^3$/H).

Test Example 4

Figure 10:
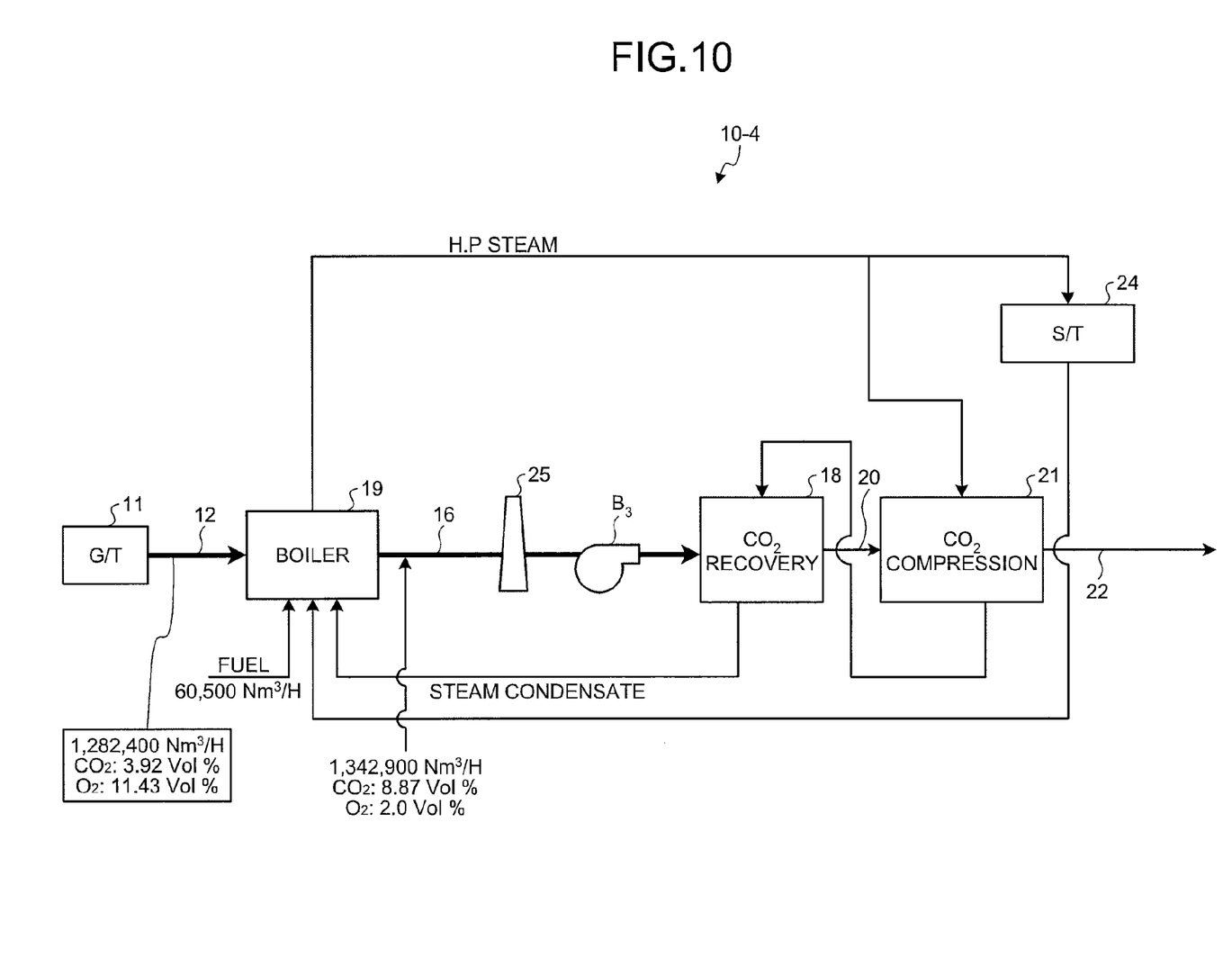
FIG. 10 is a schematic diagram of a flue gas treatment apparatus according to a test example 4.

FIG. 10 is a schematic diagram of an apparatus similar to the flue gas treatment apparatus according to the fourth embodiment shown in FIG. 4. In the apparatus of FIG. 10, the total amount of the flue gas 12 (flow rate: 1,282,400 $Nm^3$/H, $CO_2$ concentration: 3.92 vol %, and $O_2$ concentration: 11.43 vol %) emitted from the gas turbine 11 was introduced into the boiler 19. The flow rate of the fuel supplied to the boiler 19 was 60,500 $Nm^3$/H.

In this example, since the total amount of the flue gas 12 from the gas turbine 11 was introduced into the boiler 19, the $CO_2$ concentration in the flue gas 16 (flow rate: 1,342,900 $Nm^3$/H, $O_2$ concentration: 2.0 vol %) could be increased to 8.87 vol %.

Test Example 5

Figure 11:
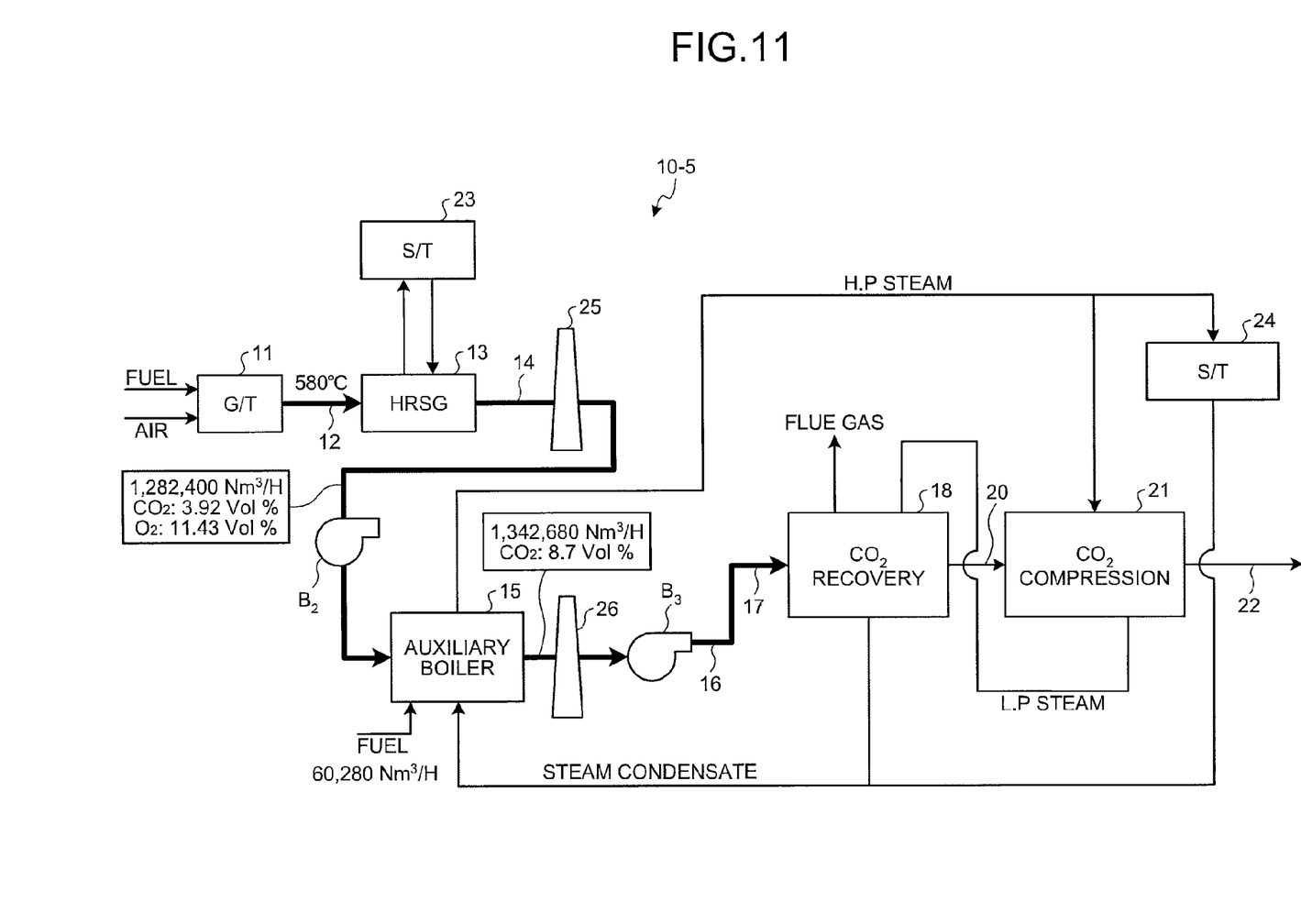
FIG. 11 is a schematic diagram of a flue gas treatment apparatus according to a test example 5.

FIG. 11 is a schematic diagram of an apparatus similar to the flue gas treatment apparatus according to the fifth embodiment shown in FIG. 5. In the apparatus of FIG. 11, the exhaust heat of the flue gas 12 (of 580° C.) from the gas turbine 11 was recovered in the exhaust heat recovery boiler 13, and the total amount of the flue gas 14 (flow rate: 1,282,400 $Nm^3$/H, $CO_2$ concentration: 3.92 vol %, $O_2$ concentration: 11.43 vol %) from the exhaust heat recovery boiler 13 was introduced into the auxiliary boiler 15. The flow rate of the fuel supplied to the auxiliary boiler 15 was 60,280 $Nm^3$/H.

In this example, the $CO_2$ concentration in the flue gas 16 emitted from the auxiliary boiler 15 was 8.7 vol % (and the flow rate was 1,342,680 $Nm^3$/H).

As can be seen from the test examples 1 to 5, when a part or a whole of the flue gas at the upstream side or the downstream side of the exhaust heat recovery boiler (HRSG), which recovers a heat of a high-temperature flue gas emitted from the gas turbine, is introduced and burnt in the auxiliary boiler and the boiler as in the embodiments of the present invention, the carbon dioxide concentration in the flue gas can be increased. Therefore, the efficiency of the subsequent recovery of the carbon dioxide in the carbon dioxide recovery apparatus can be increased.

According to the embodiments of the present invention, a part or a whole of the flue gas is introduced into the auxiliary boiler and the boiler and burnt so that the carbon dioxide concentration in the flue gas is increased, whereby the recovery efficiency of the carbon dioxide recovery apparatus can be improved. In addition, since the auxiliary boiler and the boiler can generate a high-pressure steam required for the recovery and the compression of carbon dioxide, the steam generated in the exhaust heat recovery boiler is not used in the recovery of carbon dioxide.

INDUSTRIAL APPLICABILITY

As can be seen from the foregoing, according to the method and the apparatus for flue gas treatment according to the present invention, a part or a whole of the flue gas at the upstream side or the downstream side of the exhaust heat recovery boiler (HRSG), which recovers a heat of the high-temperature flue gas, is introduced and burnt in one of the auxiliary boiler and the boiler so that the carbon dioxide concentration in the flue gas is increased, and subsequently the carbon dioxide recovery apparatus recovers carbon dioxide. Therefore, the method and the apparatus for flue gas treatment according to the present invention are suitable for recovery of carbon dioxide in gas turbine plants.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for flue gas treatment comprising:
arranging an exhaust heat recovery boiler at a downstream side of a gas turbine;
supplying the exhaust heat recovery boiler with the flue gas emitted from the gas turbine through a first line connecting the gas turbine with the exhaust heat recovery boiler;
emitting the flue gas from the exhaust heat recovery boiler through a second line connected to the exhaust heat recovery boiler;
branching from either one of the first line and the second line a part of the flue gas emitted from respective one of the gas turbine and the exhaust heat recovery boiler through a branch line connected to an auxiliary boiler;
supplying the auxiliary boiler with fuel and at least the part of the flue gas;
causing a combustion in the auxiliary boiler using the fuel and at least a part of the flue gas, thereby increasing a concentration of carbon dioxide in the flue gas;
generating a high-pressure steam at the auxiliary boiler;
emitting the flue gas from the auxiliary boiler through a third line connected to the auxiliary boiler;
connecting the second line and the third line with a carbon dioxide recovery apparatus through a fourth line;
combining the flue gas emitted from the auxiliary boiler with the flue gas emitted from the exhaust heat recovery boiler in the fourth line so that the carbon dioxide concentration of a combined flue gas is increased to a concentration range where the carbon dioxide recovering apparatus works efficiently;
recovering carbon dioxide included in combined emission of the auxiliary boiler and the exhaust heat recovery boiler having increased carbon dioxide concentration in a carbon dioxide recovery apparatus;
supplying a carbon dioxide compression apparatus with the carbon dioxide recovered in the recovering step and the high-pressure steam generated at the generating step; and
compressing the carbon dioxide supplied using the high-pressure steam in the carbon dioxide compression apparatus, wherein
the recovering step employs the high-pressure steam after being used in the compressing step for separating the carbon dioxide, and
the method further includes returning steam condensate to the auxiliary boiler.

2. The method according to claim 1, wherein low pressure steam generated in the carbon dioxide compression apparatus is used in the carbon dioxide recovery apparatus.

3. An apparatus for flue gas treatment comprising:
a gas turbine;
an exhaust heat recovery boiler arranged at a downstream side of the gas turbine;

an auxiliary boiler that is arranged at a downstream side of the gas turbine, and that causes a combustion using fuel and at least a part of a flue gas emitted from the gas turbine thereby increasing a concentration of carbon dioxide in the flue gas and generates a high-pressure steam;

a carbon dioxide recovery apparatus that is arranged at a downstream side of the auxiliary boiler, and that recovers carbon dioxide in the flue gas emitted from the auxiliary boiler having increased carbon dioxide concentration;

a first line connecting the gas turbine with the exhaust heat recovery boiler through which the flue gas emitted from the gas turbine passes;

a second line connected to the exhaust heat recovery boiler through which the flue gas emitted from the exhaust heat recovery boiler passes;

a branch line branching from either one of the first line and the second line and connected to the auxiliary boiler through which a branched part of the flue gas emitted from respective one of the gas turbine and the exhaust heat recovery boiler passes;

a third line connected to the auxiliary boiler through which the flue gas emitted from the auxiliary boiler passes;

a fourth line connecting the second line and the third line with the carbon dioxide recovery apparatus in which the flue gas emitted from the auxiliary boiler is combined with the flue gas emitted from the exhaust heat recovery boiler so that the carbon dioxide concentration of a combined flue gas is increased to a concentration range where the carbon dioxide recovering apparatus works efficiently and the combined flue gas is supplied to the carbon dioxide recovering apparatus; and a carbon dioxide compression apparatus that is arranged at a downstream side of the carbon dioxide recovery apparatus and connected to the auxiliary boiler so that the carbon dioxide compression apparatus is supplied with the high-pressure steam, and that compresses the carbon dioxide recovered in the carbon dioxide recovery apparatus using the high-pressure steam, wherein the carbon dioxide recovering apparatus is connected to the carbon dioxide compression apparatus and is configured to separate the carbon dioxide employing the high-pressure steam after being used in the carbon dioxide compression apparatus, and the carbon dioxide compression apparatus is connected to the auxiliary boiler to return steam condensate.

4. The apparatus according to claim 3, wherein
a part of a flue gas emitted from the exhaust heat recovery boiler is used in the auxiliary boiler.

5. The apparatus for flue gas treatment according to claim 3, wherein low pressure steam generated in the carbon dioxide compression apparatus is used in the carbon dioxide recovery apparatus.

6. An apparatus for flue gas treatment comprising
a first gas turbine;
an auxiliary boiler that is arranged at a downstream side of the first gas turbine, and that causes a combustion using fuel and a total amount of a flue gas emitted from the first gas turbine thereby increasing a concentration of carbon dioxide in the flue gas and generates a high-pressure steam;

a plurality of second gas turbines;
plural exhaust heat recovery boilers arranged respectively at downstream sides of the second gas turbines;
a carbon dioxide recovery apparatus that is arranged at a downstream side of the auxiliary boiler, and that recovers carbon dioxide in the flue gas emitted from the auxiliary boiler having increased carbon dioxide concentration;

a plurality of first lines, each of which connecting each of the second gas turbines with respective one of the plural exhaust heat recovery boilers through which the flue gas emitted from each of the second gas turbines passes;

a plurality of second lines, each of which connected to the respective one of the exhaust heat recovery boilers through which the flue gas emitted from the respective one of the exhaust heat recover boilers passes;

a fifth line connecting the first gas turbine with the auxiliary boiler through which the flue gas emitted from the first gas turbine passes;

a third line connected to the auxiliary boiler through which the flue gas emitted from the auxiliary boiler passes;

a fourth line connecting the plurality of second lines and the third line with the carbon dioxide recovery apparatus in which the flue gas emitted from the auxiliary boiler is combined with the flue gas emitted from the exhaust heat recovery boiler so that the carbon dioxide concentration of a combined flue gas is increased to a concentration range where the carbon dioxide recovering apparatus works efficiently and the combined flue gas is supplied to the carbon dioxide recovering apparatus; and a carbon dioxide compression apparatus that is arranged at a downstream side of the carbon dioxide recovery apparatus and connected to the auxiliary boiler so that the carbon dioxide compression apparatus is supplied with the high-pressure stream, and that compresses the carbon dioxide recovered in the carbon dioxide recovery apparatus using the high-pressure stream, wherein the carbon dioxide recovering apparatus is connected to the carbon dioxide compression apparatus and is configured to separate the carbon dioxide employing the high-pressure steam after being used in the carbon dioxide compression apparatus, and the carbon dioxide compression apparatus is connected to the auxiliary boiler to return steam condensate.

* * * * *